United States Patent
Jackson et al.

[11] Patent Number: 6,006,908
[45] Date of Patent: Dec. 28, 1999

[54] MULTI-USE PACKAGING ARTICLE FOR TIE-DOWN ASSEMBLY

[75] Inventors: Stephen D. Jackson, Stockton; Mark S. Faulconer; Tim J. Bowman, both of Newport Beach, all of Calif.

[73] Assignee: USA Products, Lodi, Calif.

[21] Appl. No.: 09/132,114

[22] Filed: Aug. 11, 1998

[51] Int. Cl.⁶ .................................................. B65D 85/04
[52] U.S. Cl. ......................... 206/388; 206/586; 206/806
[58] Field of Search ............................. 206/388, 495, 206/419, 420, 806; 242/405, 405.1–405.3

[56] References Cited

U.S. PATENT DOCUMENTS

| | | | |
|---|---|---|---|
| 2,287,368 | 6/1942 | Anderson | 242/405.2 |
| 4,123,012 | 10/1978 | Hough | 242/85.1 |
| 4,172,521 | 10/1979 | Eubanks et al. | 206/388 |
| 4,193,563 | 3/1980 | Vitale | 242/85 |
| 4,261,529 | 4/1981 | Sandberg et al. | 242/85.1 |
| 4,321,755 | 3/1982 | Illgen | 242/405.1 |
| 4,778,125 | 10/1988 | Hu | 242/85.1 |
| 4,779,815 | 10/1988 | Moore et al. | 242/85.1 |
| 4,779,816 | 10/1988 | Varlet | 242/96 |
| 4,921,098 | 5/1990 | Combier et al. | 206/388 |
| 5,064,067 | 11/1991 | McAllister et al. | 206/420 |
| 5,114,010 | 5/1992 | Smith | 206/453 |
| 5,168,999 | 12/1992 | Lee et al. | 206/420 |
| 5,174,450 | 12/1992 | Upchurch | 206/39.1 |
| 5,311,996 | 5/1994 | Duffy et al. | 206/453 |
| 5,340,250 | 8/1994 | Meriwether et al. | 410/99 |
| 5,458,241 | 10/1995 | Brown | 206/419 |

*Primary Examiner*—Jim Foster
*Attorney, Agent, or Firm*—Limbach & Limbach LLP

[57] ABSTRACT

A packaging article for a tie-down assembly that includes a tension strap is described that has multiple uses. The packaging article can be used for retail display of the assembly and for later storage of the assembly. The article has further uses in the operation of a tie-down assembly by providing guide slots for receiving and retaining a tension strap or cord and by providing an edge protector to protect the edges of a load secured by a tension strap or cord. The packaging article comprises a generally planar frame with guide members or retaining members that define the guide slots extending upwards from the frame surface and edge protector members that extend downward from one side of the frame perpendicular to the frame plane.

25 Claims, 9 Drawing Sheets

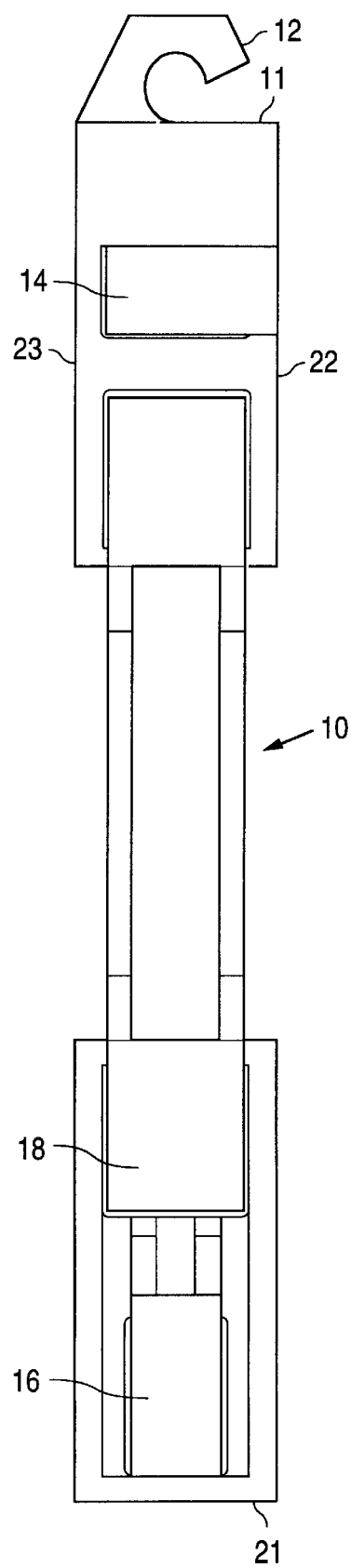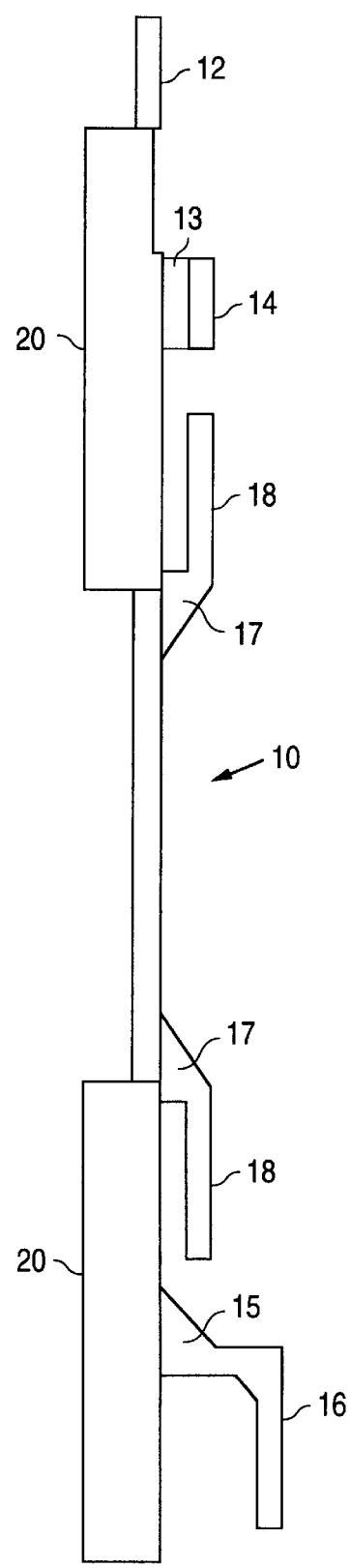
FIG. 2   FIG. 3

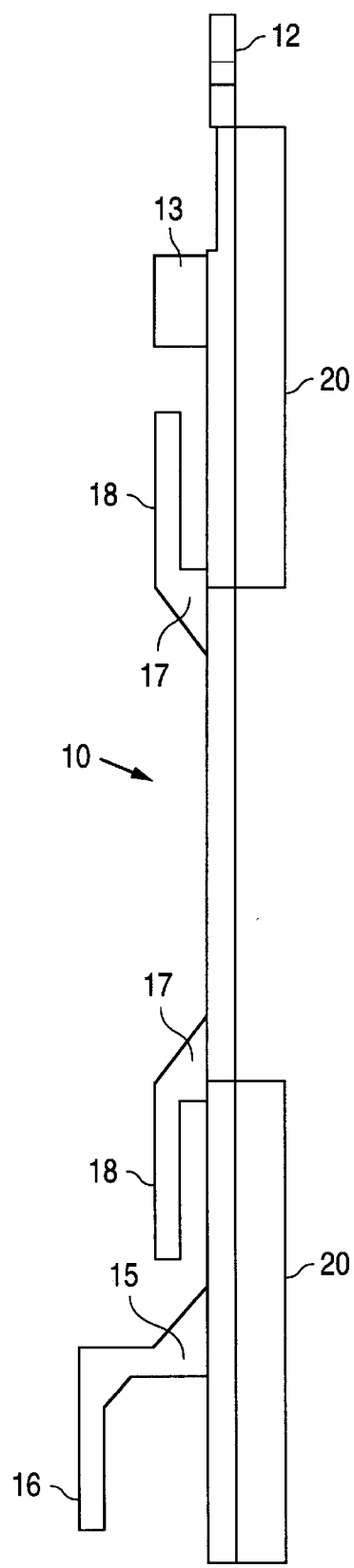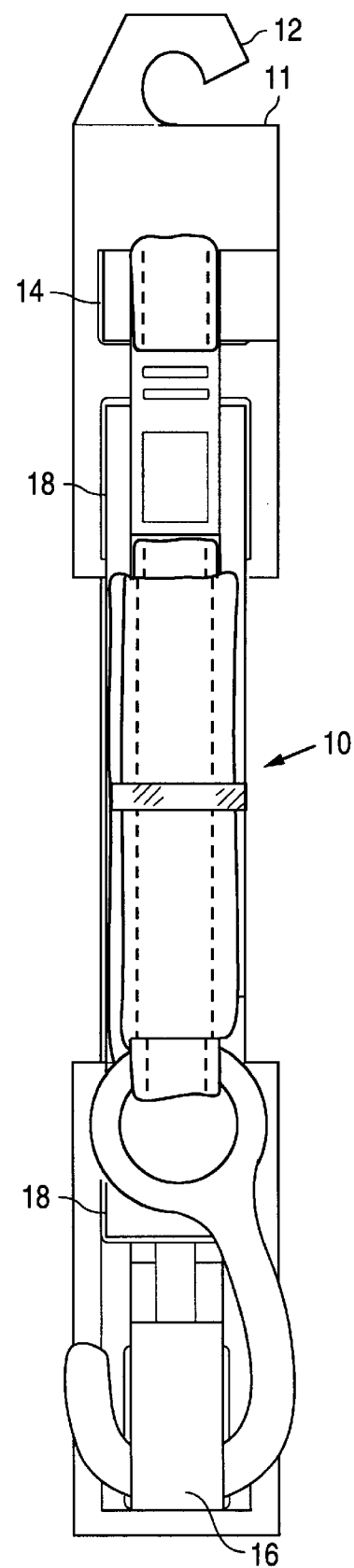
FIG. 4  FIG. 5

6,006,908

MULTI-USE PACKAGING ARTICLE FOR TIE-DOWN ASSEMBLY

BACKGROUND OF THE INVENTION

1. Field of the Invention

The present invention relates to a packaging and retail display article, and more particularly to a packaging and retail display article for displaying tie-down assemblies.

2. Description of the Related Art

Typical tie-down assemblies consist of a rope, cord, line, or webbing strap with fasteners, such as hooks, at either end that attach to fixed points, and a tensioning mechanism, such as a ratchet assembly for imparting tension to the rope, cord, line or strap to secure a load in place. Other types of tie-down assemblies include ropes, cords, lines or straps that are themselves elastic and that can be pulled taut to secure a load under tension. These tie-down assemblies can vary in size and load-bearing capability and therefore can be used to secure both heavy and lighter weight loads. Tie-down assemblies are used, for example, in the hauling and transport of cargo and freight, as well as for securing gear for activities such as camping or boating or other marine applications. Tie-down assemblies are routinely packaged for shipment and display in disposable transparent plastic packages or containers. Common forms of packaging include a pre-formed transparent plastic piece configured to correspond to the shape of the packaged article adhered to a cardboard backing, or a pair of pre-formed transparent plastic pieces configured to correspond to the shape of the packaged article that snap-fit or are welded together along their periphery. These packaging materials have no utility other than for display purposes, and therefore, once a customer purchases the tie-down assembly, the packaging materials are discarded as refuse.

At the same time, users of tie-down assemblies have a need for accessories that aid the user in the use and storage of the tie-down assembly. For example, where more than one tensioning strap or cord is used to secure a load, as is frequently the case, there is a desire to maintain the tension straps or cords at a fixed spacing from one another to provide more uniform tension on the load itself and to prevent movement of the tension straps or cords. Articles that provide guide slots for orienting the tension straps or lines and maintaining the tension straps or lines in place are therefore useful when using a tie-down assembly to secure a load. Also, the tension imparted on the secured load by the tensioned straps or cords can sometimes cause damage to edges of the load. Articles that provide protection to edges of loads by distributing the force imparted by the tensioning strap or cord across a broader surface area of the secured load are useful in avoiding or minimizing damage to the load edge. Further, users of tie down assemblies are also in need of storage means for winding up and storing the tensioning straps or cords in a space-saving, efficient and organized manner when the assembly is not in use.

Therefore, there would be an environmental benefit to providing a packaging article for tie-down assemblies that was recyclable for secondary uses, and there would be a further benefit for a consumer to provide for a packaging material that had utility in the storage and use of the purchased tie-down assembly during the lifespan of the tie-down assembly.

SUMMARY OF THE INVENTION

The present invention provides for a packaging article for the retail display of a tie-down assembly having the further advantages of utility in the use and storage of a tie-down assembly. The invention provides for a packaging article comprising a planar frame to which a tie-down assembly can be attached and a hook extending from the frame for hanging the packaging article for retail display. In one embodiment of the invention, retention members extend upward from the frame for securing the tension straps or cords of a tie-down assembly and the hooks or other like fasteners typically used in a tie-down assembly. In another embodiment of the invention, the retention members extend upward from the frame and are configured to secure only the hook or other like fastener of a tie-down assembly. The retention members can be used for both displaying the tie-down assembly for retail purposes and for subsequently storing the assembly when not in use. In yet another embodiment of the invention, edge members extend from the upper and lower corner edges of the frame that can retain a tension strap or cord that is wound around the packaging article when it is used for storage.

The invention also provides for guide slots through which a tensioning strap or cord of a tie-down assembly can be threaded during use of the assembly. In one embodiment of the invention, guide members extend upward from the frame to provide the guide slots. In another embodiment of the invention, the guide slots are defined by the space between adjacent retaining members. Depending on the number and the configuration of the guide slots, the guide slots can operate to restrict movement of the threaded cord or strap in directions along the frame. In one embodiment of the invention, the guide slots operate to restrict movement of the threaded strap or cord toward the frame center. In another embodiment of the invention, the guide slots operate to restrict movement toward the frame ends. In yet another embodiment of the invention, the guide slots can restrict motion in both directions along the frame length.

The invention further provides edge guard members that extend perpendicularly from one of the side edges of the frame. In use with a tie-down assembly, the frame can be engaged with the edge of a secured load. Tension straps or cords threaded through the guide slots will pass over the edge guard members and the force imparted by the tension straps or cords will be redistributed through both the edge guard member and frame, minimizing damage to the load edge.

BRIEF DESCRIPTION OF THE DRAWINGS

FIG. 2 is a plan view of the packaging article of FIG. 1;

FIG. 3 is a left side view of the packaging article of FIG. 2;

FIG. 4 is a right side view of the packaging article of FIG. 2;

FIG. 5 is a plan view of the packaging article of FIG. 1 illustrating a tie-down assembly secured to the article;

DETAILED DESCRIPTION OF THE INVENTION

FIGS. 1–6 show a first embodiment of a packaging article for a tie-down assembly constructed according to the present invention. The packaging article 10 is comprised of a frame of a generally planar configuration, making the article suitable for hanging from a pegboard or free-standing rack for retail sales display of the article and attached tie-down assembly product in a space efficient manner. A hook 12 extends from the upper edge 11 of the frame for hanging the article for both retail display purposes as well as for the later purpose of storing a tie-down. The generally planar configuration of the packaging article also allows it to effectively function as a both a tension strap or cord guide and an edge protector when the article is used in conjunction with one or more tie-down assemblies to secure a load.

Figure 1:
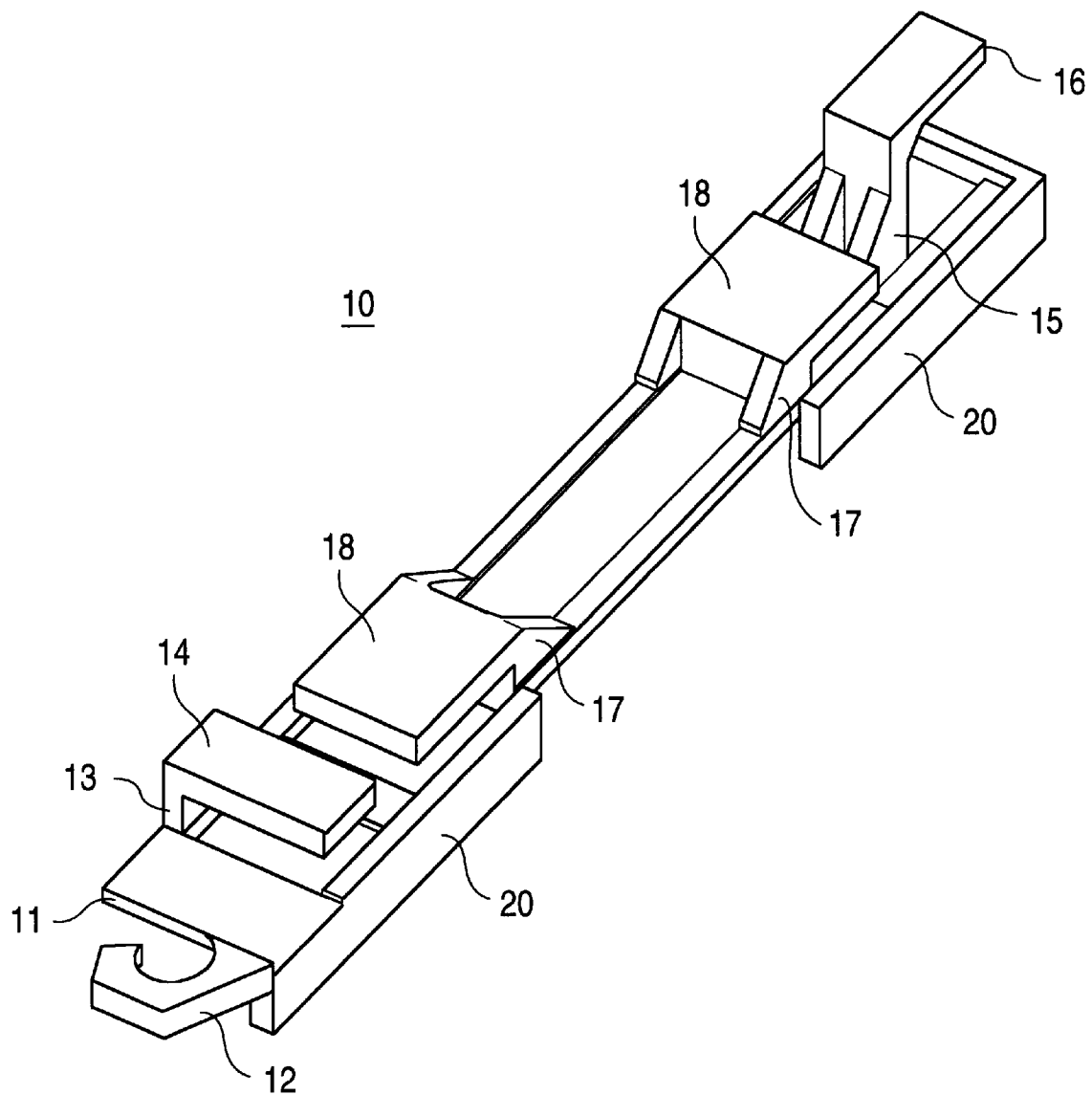
FIG. 1 is a perspective view of a packaging article for a tie-down assembly according to a first embodiment of the invention.
Figure 6:
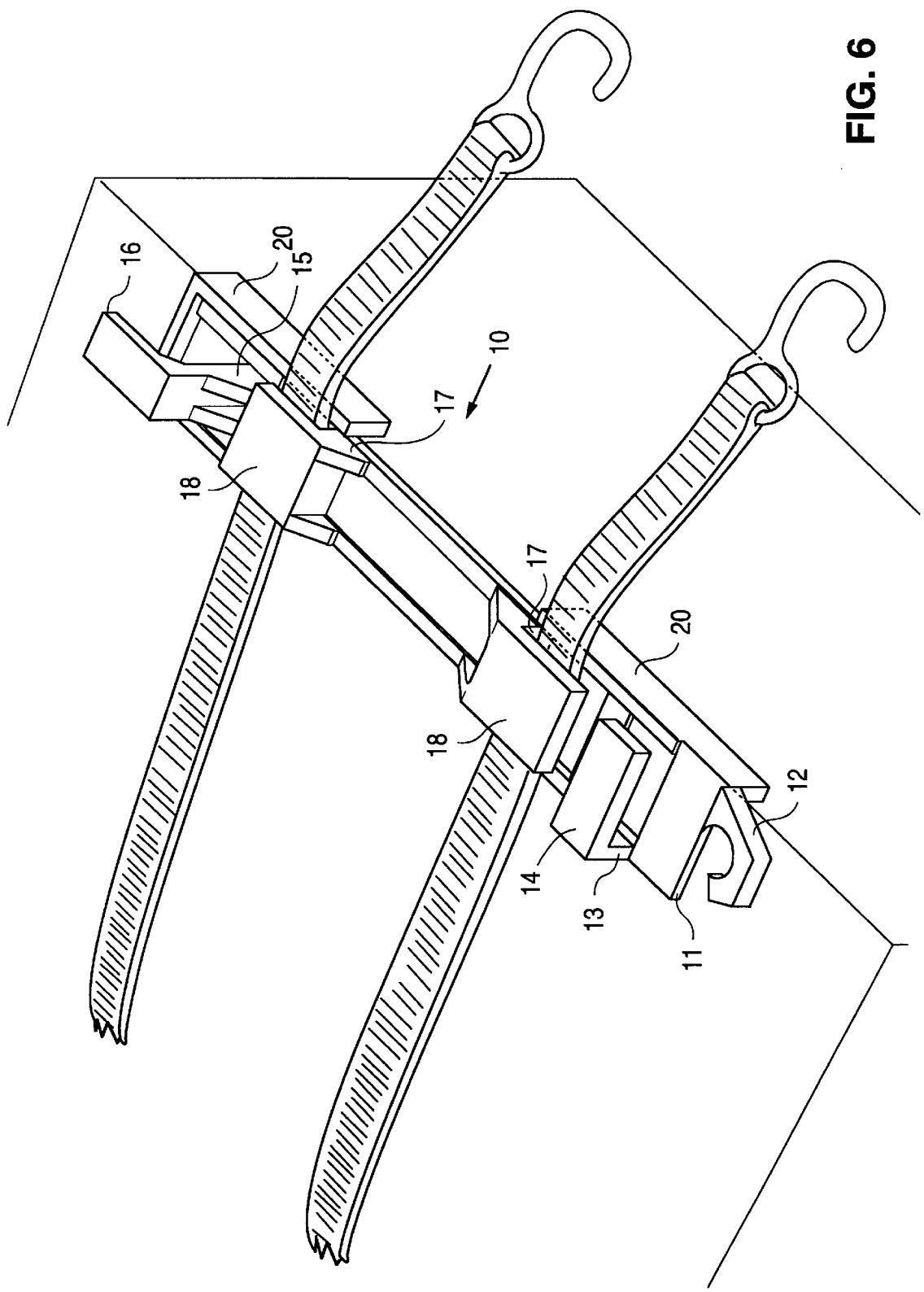
FIG. 6 is a perspective view of the packaging article of FIG. 1 illustrating the article positioned to protect the edge of a secured load.
Figure 7:
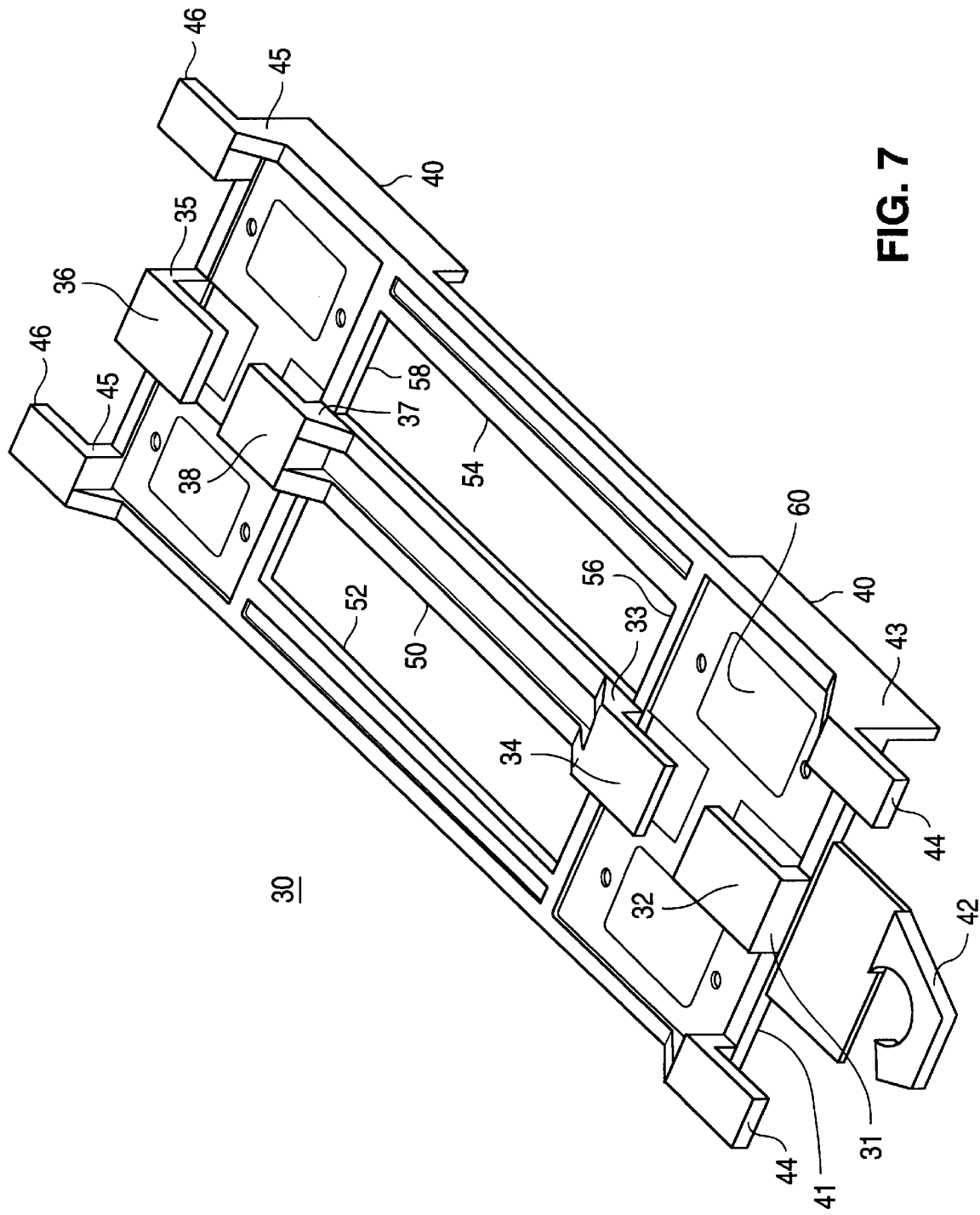
FIG. 7 is a perspective view of a packaging article for a tie-down assembly according to a second embodiment of the invention.
Figure 8:
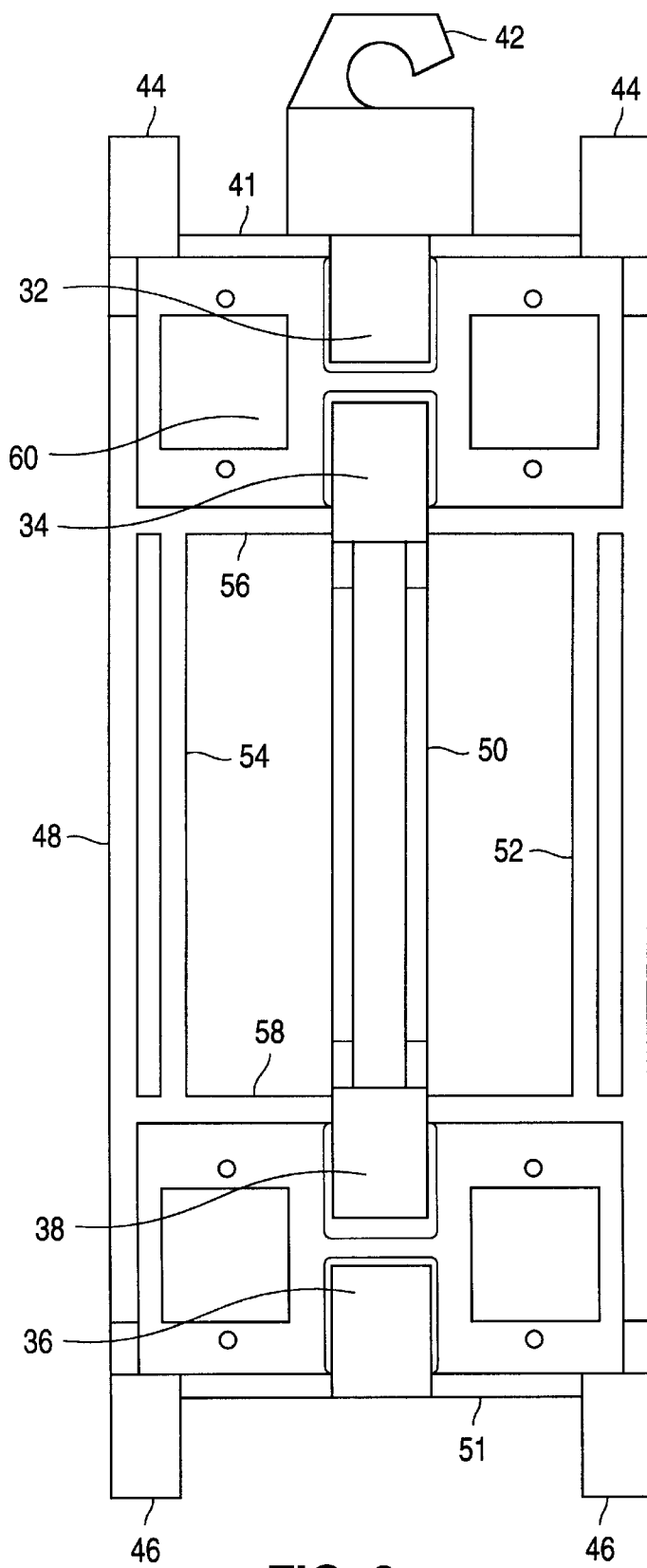
FIG. 8 is a plan view of the packaging article of FIG. 7.
Figure 9:
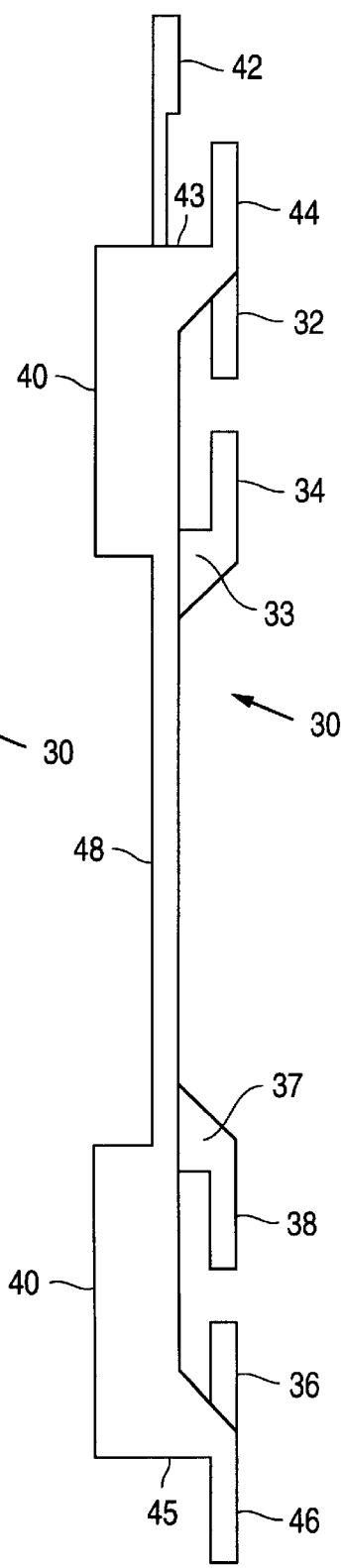
FIG. 9 is a left side view of the packaging article of FIG. 8.

Guide members 17, 17 extend upward from the frame surface and have arms 18, 18 that extend outward and away from one another in a direction parallel to the frame length, as depicted in FIGS. 1–6. The guide members are spaced apart from one another and provide slots for receiving a tension strap or cord when the tension strap or cord is used to secure a load, as illustrated in FIG. 6. The slots are defined by the frame surface, the bases of the guide member, and the bottom sides of the guide member arms, and have openings directed away from one another. In this configuration, movement of the engaged straps towards one another is prevented. It is preferred that bottom surfaces of arms 18, 18 are planar and are oriented parallel to the frame plane. Such a configuration provides for easy threading and engagement of a tension strap and also operates to prevent twisting or cocking of the strap once engaged. The invention however contemplates alternative configurations of guide member arms, provided the arms define a guide slot for receiving and retaining a tension strap or cord.

Upper and lower restraining members 13 and 15 also extend upward from the frame surface, as shown in FIGS. 1–6. Lower restraining member 13 includes arm 16 that extends from the member in a direction lengthwise of the frame and towards the lower end of the frame. Upper restraining member 13 extends upward from the frame surface at the side edge 22 of the frame and includes arm 14 that extends across the frame transverse to the frame length and terminates in a position in proximity to the opposite side edge 23. The restraining members 13 and 15 provide attachment points for attaching a tie-down assembly, as depicted in FIG. 5. To secure a tie-down assembly to this embodiment, the tension strap or cord of the assembly is passed around the arm 14 and the hook or other like fastener of the assembly is engaged with the lower restraining member 15. The remaining strap or cord can be bundled up and nested in the area of the frame between the guide members 17, 17 and secured to the frame by means of a band or a tie. In this manner, the packaged tie-down assembly can be hung for retail display and will also have a low overall profile allowing for more efficient use of retail display space. Once purchased, the user of the tie-down assembly can secure the tie-down assembly to the article in much the same manner in order to store the assembly in an organized fashion when the assembly is not in use. It is preferred that lower restraining member 15 extend further from frame surface than upper restraining member 13 or guide members 17, 17 in order to accommodate the retention of the hook or other like fastener. It is further preferred that the bottom and top surfaces of arms 18, 18 are planar and are oriented parallel to the frame plane in order to better accommodate the engagement of a tension strap.

Edge guard members 20, 20 are planar and extend downward from side edge 23 perpendicular to the frame plane. As shown in FIGS. 1–6, the guard members are located at the upper and lower portions of the frame, and extend from the upper and lower frame edges 11 and 21, respectively, towards the middle of the frame. FIG. 6 shows the embodiment in use as an edge protector for a secured load. Tension straps are passed through guide slots provided by guide members 18, 18 and pass over the edge guard members 20, 20. The tension force of the straps is thereby spread across the surface area of the article that is in contact with the secured load, namely, the underside of the frame and the edge guard members, thus lessening the force imparted upon the edge of the load at the direct sites where the straps pass over the edge. Alternatively, a single guard member spanning the entire length of the frame or a portion of the frame length can be employed.

FIGS. 7–10 depict a second embodiment of a packaging article for a tie-down assembly constructed according to the present invention. The packaging article 30 is again comprised of a frame of a generally planar configuration suitable for hanging for both display and storage purposes by means of a hook 42 that extends from the upper edge 41 of the frame. In this embodiment, the frame comprises a center wall 50 and spaced apart side walls 52 and 54 that are substantially parallel to one another. The center and sidewalls are connected at their respective ends by cross members 56 and 58.

Figure 10:
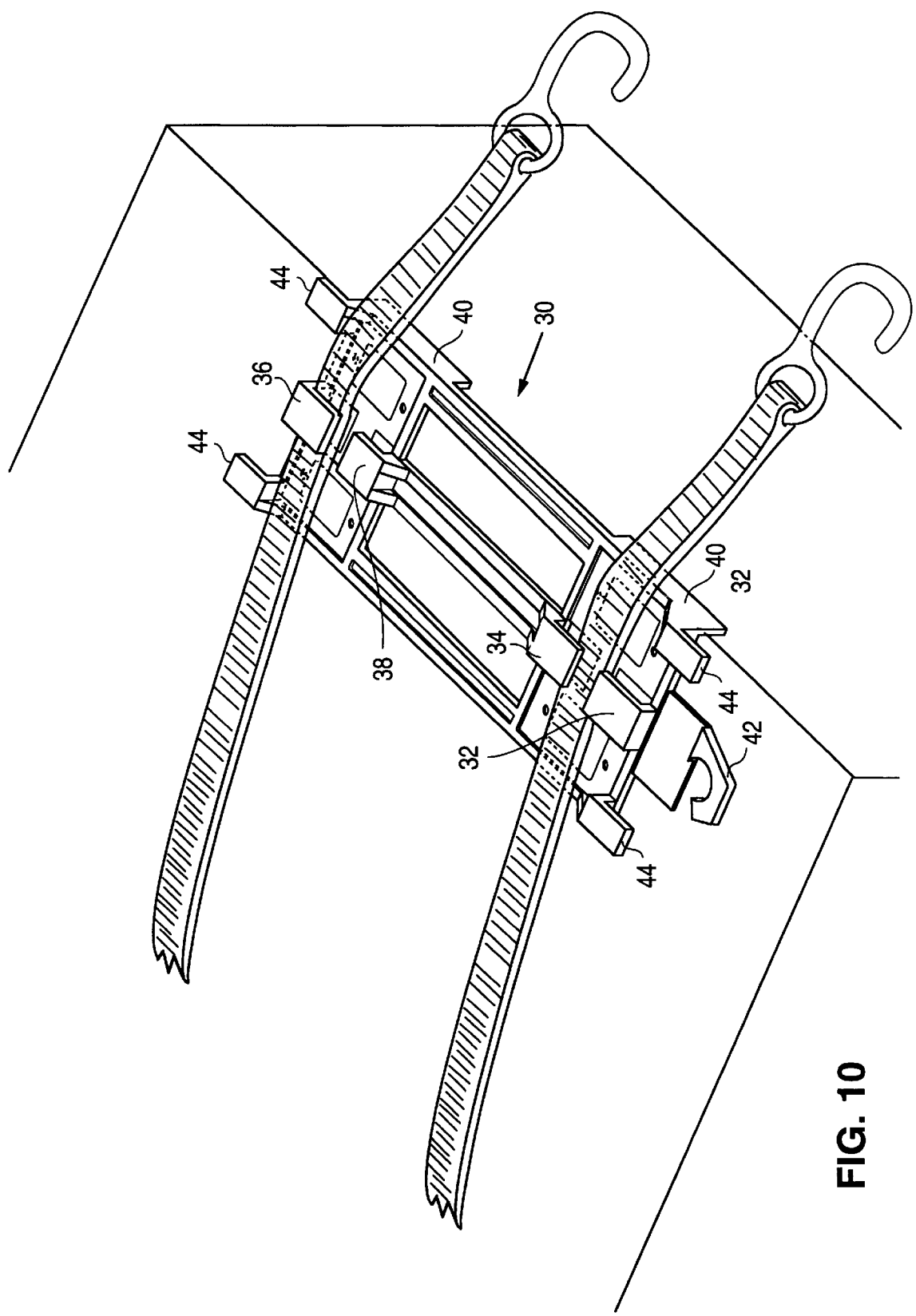
FIG. 10 is a perspective view of the packaging article of FIG. 7 illustrating the article positioned to protect the edge of a secured load.
Figure 11:
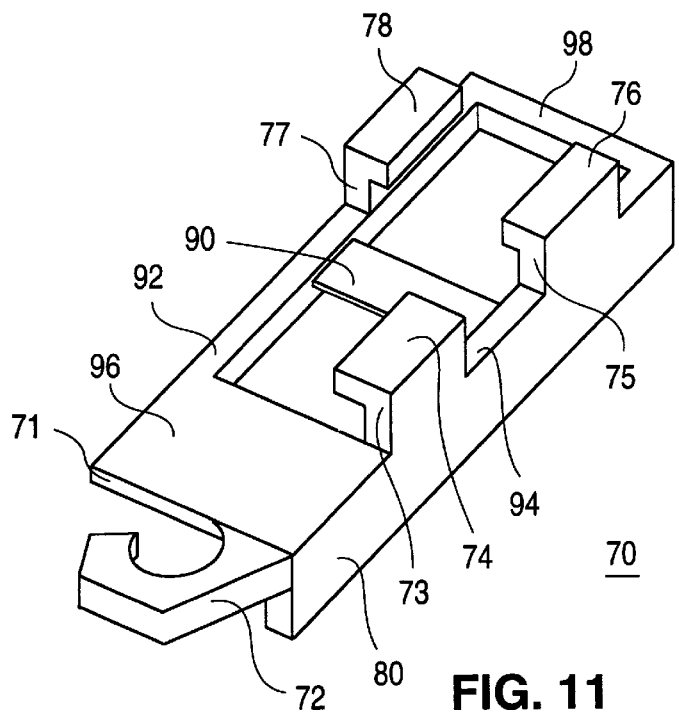
FIG. 11 is a perspective view of a packaging article for a tie-down assembly according to a third embodiment of the invention.
Figure 12:
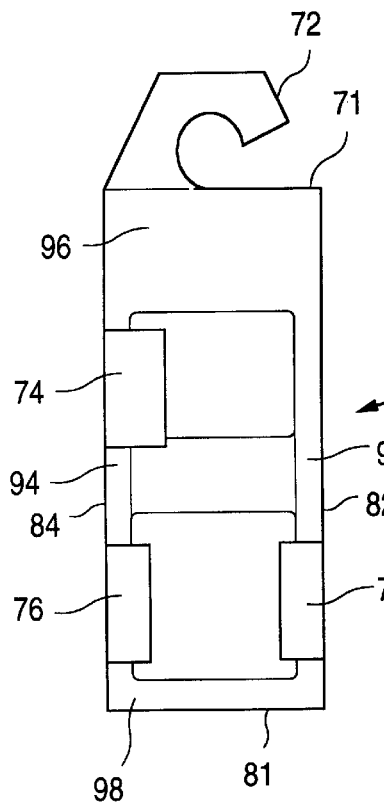
FIG. 12 is a plan view of the packaging article of FIG. 11.
Figure 13:
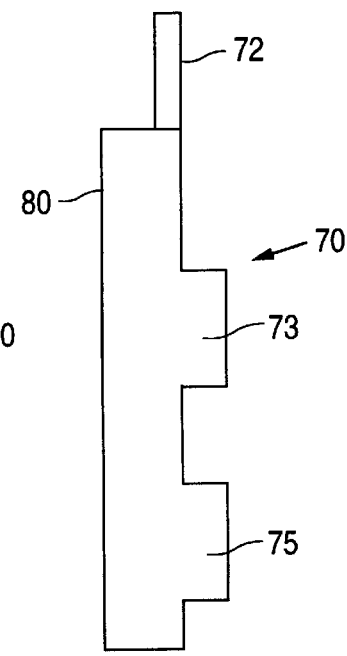
FIG. 13 is a left side view of the packaging article of FIG. 12.
Figure 14:
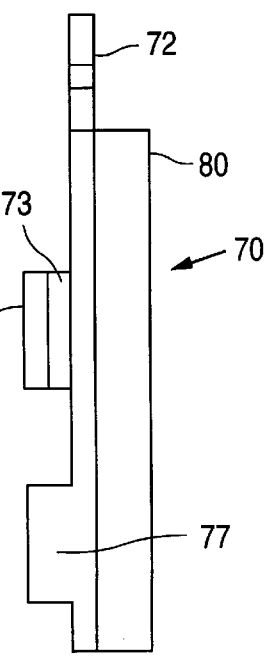
FIG. 14 is a right side view of the packaging article of FIG. 12.

Two pairs of guide members extend upward from the frame surface near the upper and lower ends of the frame, as depicted in FIGS. 7–10. The upper pair comprises guide members 31 and 33. Guide member 31 extends upward from the frame surface at upper edge 41 and includes arm 32 that extends in a direction parallel to the frame length toward the lower end of the frame. Guide member 33 extends upward from the frame surface at the upper end of center wall 50 where the center wall joins cross member 56 and includes arm 34 that extends in a direction parallel to the frame length back toward arm 32. The lower pair of guide members 35 and 37 are similarly configured with guide member 35 extending upward from the frame surface at lower edge 51 and having arm 36 that extends in a direction parallel to the frame length toward the upper end of the frame. Guide member 37 extends upward from the frame surface at the lower end of center wall 50 where the center wall joins cross member 58 and includes arm 38 that extends in a direction parallel to the frame length back toward arm 36. Each pair of guide members provides for slots for receiving a tension strap or cord when the tension strap or cord is used to secure a load, as illustrated in FIG. 10. As in the first embodiment, the slots are defined by the frame surface, the bases of the guide members, and the bottom sides of the guide member arms. In this embodiment, each pair of guide members provide for slots that restrict movement of the engaged straps both towards and away from the center of the frame. As in the first embodiment, it is preferred that bottom surfaces of arms 32, 34, 36 and 38 are planar and are oriented parallel to the frame plane to provide for easy threading and engagement of a tension strap and to prevent twisting or cocking of the strap once engaged.

Upper and lower edge members 43 and 45 extend upward from the cross members 56 and 58 at the upper and lower edges 41 and 51. The sides of the edge members 43 and 45 are formed flush with frame sides 47 and 48, as depicted in FIGS. 7–10. Fingers 44 and 46 extend from edge members 43 and 45 respectively in directions parallel to the frame length with fingers 44 extending away from lower edge 51 and fingers 46 extending away from upper edge 41.

A typical tie-down assembly that can be packaged for display with this embodiment can consist of a tension strap, cord, rope or line that is wound around upon itself or upon a separate reel, and tied or otherwise attached to center wall 50 and/or side walls 52 and 54. The embodiment also includes cut-outs in cross members 56 and 58 that can be configured to receive other accessories for use with a tie-down assembly. The particular cut-outs 60 depicted in FIGS. 7–10 are of a generally square shape configured to receive anchor points which are commonly used to provide fixed attachment sites in a truck bed for securing a load with a tie-down assembly. The configuration of the cut-outs can vary to accommodate a number of different accessories that are typically sold in connection with different types of tie-down assemblies. Once purchased, the user of the tie-down assembly can store the tie-down assembly by winding the tension strap or cord around this embodiment of the invention in a lengthwise fashion. The fingers 44 and 46 provide restraints to keep the wound strap or cord from slipping off the article when used for storage purposes.

As in the first embodiment, planar edge guard members 40, 40 extend downward from side edge 48 perpendicular to the frame plane, as depicted in FIGS. 7–10. The guard members are located at the upper and lower portions of the frame, and extend toward the center of the frame from the upper and lower frame edges 41 and 51. FIG. 10 shows the embodiment in use as an edge protector for a secured load by passing tension straps through the guide slots provided by the pairs of guide member arms 32, 34 and 36, 38 and over the edge guard members 40, 40.

FIGS. 11–16 show a third embodiment of a packaging article for a tie-down device according to the present invention. The packaging article 70 is comprised of a generally planar frame having spaced apart side walls 92 and 94. The side walls are substantially parallel to each other and are connected at their respective ends by cross members 96 and 98. Center cross strut 90 connects the middle portions of side walls 92 and 94 to one another and is itself substantially parallel to cross members 96 and 98. A hook 72 extends from upper edge 71 for hanging the frame for display and storage purposes.

Figure 15:
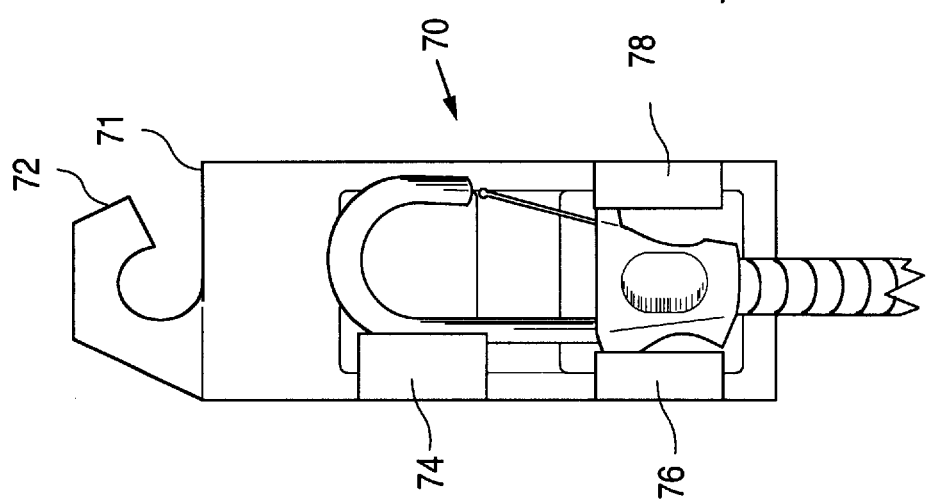
FIG. 15 is a perspective view of the packaging article of FIG. 11 illustrating a tie-down assembly secured to the article.

Side restraining members 73, 75 and 77 extend upward from the frame surface for releasably securing a hook-type fastener of a tie-down assembly, as depicted in FIG. 15. Restraining members 73 and 75 extend upward from the frame surface at side edge 84 and include arms 74 and 76, respectively, that extend from the restraining members in a direction transverse to the frame length and toward opposite side edge 82. Restraining member 77 extends upward from the frame surface at side edge 82 and includes arm 78 that extends from the member in a direction transverse to the frame length and toward opposite side edge 84. Together with the frame surface itself, the restraining members and corresponding arms define engagement notches or slots for engaging a hook-type fastener of a tie-down assembly. The fastener releasably snaps into the engagement notches. For either retail display purposes, the remaining cord of the tie-down assembly attached to the secured fastener can be wound up or otherwise bundled. In the embodiment shown, retaining members 75 and 77 are aligned opposite one another to provide for opposing notches for engagement with the collar portion of the depicted fastener, but other configurations of retaining members are contemplated by the invention depending on the particular configuration of the fastener being secured.

Figure 16:
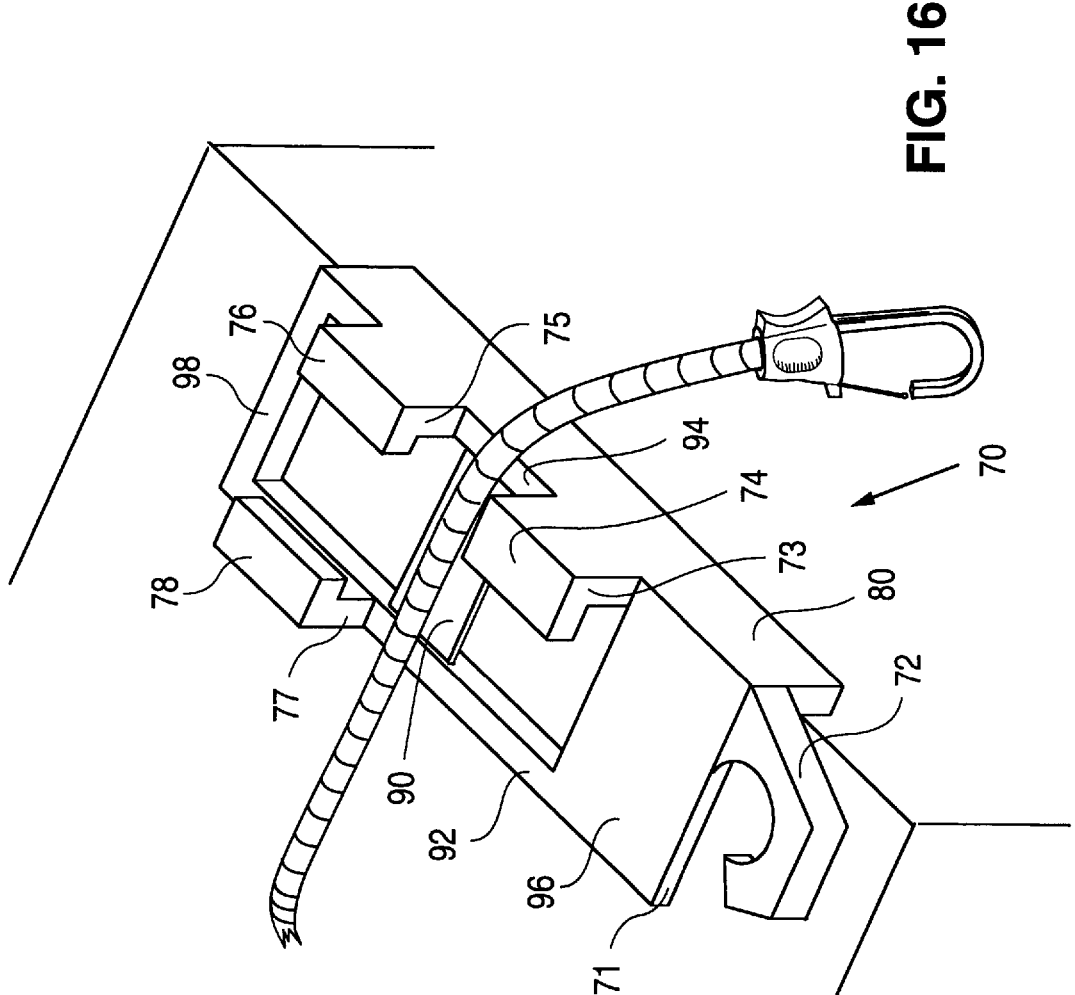
FIG. 16 is a perspective view of the packaging article of FIG. 11 illustrating the article positioned to protect the edge of a secured load.

In similar fashion to the first and second embodiments, planar edge guard member 80 extends downward from side edge 84 perpendicular to the frame plane, as depicted in FIGS. 11–16. FIG. 16 shows the embodiment in use as an edge protector for load secured by a tie-down assembly of the type depicted in FIG. 15 that includes a tension cord fixed to a hook-like fastener. The tension cord is threaded through the guide slot defined by the upper and lower ends of restraining members 75 and 73, respectively, and the portion of side wall 94 therebetween, and is then passed over edge guard member 80. The guide slot restricts movement of the tension cord toward either end of the frame.

A packaging article according to the present invention can be constructed of a variety of conventional materials having sufficient strength and rigidity to perform the various functions of the article. The preferred material is a thermoplastic resin, such as a polyethylene or a polypropylene that can be injection molded into the desired configuration by methods known in the art.

Although only certain embodiments have been illustrated and described, those having ordinary skill in the art will understand that the invention is not intended to be limited to the specifics of these embodiments, but rather is defined by the accompanying claims.

We claim:

1. A packaging article for displaying a cargo tie-down assembly including a tensioning strap or cord, the packaging article comprising:

a) a planar frame having a length, upper and lower edges, first and second side edges, and a surface;

b) a hook extending from the upper edge of the frame;

c) a planar edge guard member extending perpendicular to the frame from one of the side edges of the frame: and d) guide members projecting upward from the frame surface and having arms extending in a lengthwise direction relative to the frame, the arms having surfaces adjacent to the frame surface thereby forming guide slots for receiving a tensioning strap or cord.

2. The packaging article of claim 1 wherein the arm surfaces are planar and oriented parallel to the frame surface.

3. The packaging article of claim 1 wherein there are one or more pairs of guide members.

4. The packaging article of claim 3 wherein the pairs of guide members are spaced apart and the arms of each pair of guide members extend away from one another.

5. The packaging article of claim 1 wherein there are one or more pairs of guide members and the arms of each pair of guide members extend toward one another.

6. The packaging article of claim 1 wherein the planar edge guard member extends from a portion of one of the side edges of the frame.

7. A packaging article for displaying a cargo tie-down assembly including a tensioning strap or cord, the packaging article comprising:

a) a planar frame having a length, upper and lower edges, first and second side edges, and a surface;

b) a hook extending from the upper edge of the frame;

c) a planar edge guard member extending perpendicular to the frame from one of the side edges of the frame; and d) retaining members projecting upward from the frame surface and having arms extending therefrom.

8. The packaging article of claim 7 wherein at least one of the retaining members has an arm extending toward the bottom edge of the frame.

9. The packaging article of claim 7 wherein at least one of the retaining members has an arm extending transverse to the frame length.

10. The packaging article of claim 7 wherein a first one of the retaining members has an arm extending transverse to the frame length and toward the second side edge of the frame, and a second one of the retaining members has an arm extending transverse to the frame length and toward the first side edge of the frame.

11. The packaging article of claim 10 wherein the first one of the retaining members is formed flush with the first side edge of the frame and the second one of the retaining member is formed flush with the second side edge of the frame.

12. A packaging article for displaying a cargo tie-down assembly including a tensioning strap or cord, the packaging article comprising:

a) a planar frame having a length, upper and lower edges, first and second side edges, and a surface;

b) a hook extending from the upper edge of the frame; and c) a planar edge guard member extending perpendicular to the frame from one of the side edges of the frame;

d) upper edge members extending from the frame surface at the upper frame edge and having fingers extending away from the lower frame edge in a lengthwise direction relative to the frame, and e) lower edge members extending from the frame surface at the lower frame edge and having fingers extending away from the upper frame edge in a lengthwise direction relative to the frame.

13. The packaging article of claim 12 wherein the upper and lower edge members have sides formed flush with the side edges of the frame.

14. A packaging article for displaying a tie-down assembly including a tensioning strap or cord, the packaging article comprising:

a) a planar frame having an upper edge, a lower edge, first and second side edges, and a surface;

b) a hook extending from the upper edge of the frame;

c) one or more pairs of spaced apart guide members projecting upward from the frame surface and having arms extending away from one another in a lengthwise direction relative to the frame, the arms having surfaces adjacent to the frame surface thereby forming guide slots for receiving a tensioning strap;

d) a lower retaining member projecting upward from the frame surface and having an arm extending toward the bottom edge of the frame; and e) a planar edge guard member extending perpendicularly from one of the side edges of the frame.

15. The packaging article of claim 14 further comprising an upper retaining member projecting upward from the frame surface and having an arm extending transverse to the frame length.

16. The packaging article of claim 14 wherein the arm surfaces are planar and oriented parallel to the frame surface.

17. The packaging article of claim 14 wherein the planar edge guard member extends from a portion of one of the side edges of the frame.

18. A packaging article for displaying a tie-down assembly including a tensioning strap or cord, the packaging article comprising:

a) a planar frame having an upper edge, a lower edge, side edges, and a surface;

b) a hook extending from the upper edge of the frame;

c) two or more pairs of spaced apart guide members projecting upward from the frame surface and having arms extending toward one another in a lengthwise direction relative to the frame, the arms having surfaces adjacent to the frame surface thereby forming guide slots for receiving a tensioning strap; and d) a planar edge guard member extending perpendicularly from one of the side edges of the frame.

19. The packaging article of claim 18 wherein the arm surfaces are planar and oriented parallel to the frame surface.

20. The packaging article of claim 18 wherein the planar edge guard member extends from a portion of one of the side edges of the frame.

21. The packaging article of claim 18 further comprising upper edge members extending from the frame surface at the upper frame edge and having fingers extending away from the lower frame edge in a lengthwise direction relative to the frame, and lower edge members extending from the frame surface at the lower frame edge and having fingers extending away from the upper frame edge in a lengthwise direction relative to the frame.

22. The packaging article of claim 21 wherein the upper and lower edge members have sides formed flush with the side edges of the frame.

23. A packaging article for displaying a tie-down assembly including a tensioning strap or cord, the packaging article comprising:

a) a planar frame having a length, upper and lower edges, first and second side edges, and a surface;

b) a hook extending from the upper edge of the frame;

c) first one or more retaining members projecting upward from the frame surface and having arms extending transverse to the frame length and toward the second side edge of the frame;

d) second one or more retaining members projecting upward from the frame surface and having arms extending transverse to the frame length and toward the first side edge of the frame; and e) a planar edge guard extending perpendicularly from one of the side edges of the frame.

24. The packaging article of claim 23 wherein the retaining member arm surfaces are planar and oriented parallel to the frame surface.

25. The packaging article of claim 24 wherein the first one of the retaining members is formed flush with the first side edge of the frame and the second one of the retaining member is formed flush with the second side edge of the frame.

* * * * *